(12) United States Patent
Herron et al.

(10) Patent No.: US 11,040,904 B2
(45) Date of Patent: Jun. 22, 2021

(54) METHODS AND SYSTEMS FOR TREATING WASTEWATER VIA FORWARD OSMOSIS

(71) Applicant: FLUID TECHNOLOGY SOLUTIONS (FTS), INC., Albany, OR (US)

(72) Inventors: John Herron, Albany, OR (US); Edward Gerard Beaudry, Albany, OR (US)

(73) Assignee: FLUID TECHNOLOGY SOLUTIONS (FTS), INC., Albany, OR (US)

(*) Notice: Subject to any disclaimer, the term of this patent is extended or adjusted under 35 U.S.C. 154(b) by 267 days.

(21) Appl. No.: 15/772,266

(22) PCT Filed: Nov. 1, 2016

(86) PCT No.: PCT/US2016/059861
§ 371 (c)(1),
(2) Date: Apr. 30, 2018

(87) PCT Pub. No.: WO2017/079131
PCT Pub. Date: May 11, 2017

(65) Prior Publication Data
US 2018/0354831 A1    Dec. 13, 2018

Related U.S. Application Data

(60) Provisional application No. 62/252,280, filed on Nov. 6, 2015.

(51) Int. Cl.
*C02F 9/00* (2006.01)
*C02F 1/44* (2006.01)
(Continued)

(52) U.S. Cl.
CPC .............. *C02F 9/00* (2013.01); *B01D 61/002* (2013.01); *B01D 63/10* (2013.01); *C02F 1/001* (2013.01);
(Continued)

(58) Field of Classification Search
CPC .. C02F 9/00; C02F 1/001; C02F 1/445; C02F 1/004; C02F 2101/101; C02F 2103/36;
(Continued)

(56) References Cited

U.S. PATENT DOCUMENTS 4,033,878 A * 7/1977 Foreman ................ B01D 61/28
                                                    210/321.74
4,676,908 A    6/1987 Ciepiela et al.
(Continued)

FOREIGN PATENT DOCUMENTS

CN    204159218 U    2/2015
WO    2017053709 A1   3/2017

OTHER PUBLICATIONS

International Search Report and Written Opinion for International Application No. PCT/US2016/059861 dated Dec. 29, 2016.
(Continued)

*Primary Examiner* — David C Mellon
(74) *Attorney, Agent, or Firm* — Dorsey & Whitney LLP

(57) ABSTRACT

Embodiments disclosed herein are directed to methods and systems for treating wastewater via forward osmosis. By way of example, the methods and systems disclosed herein may be used to filter one or more precipitated salts and/or other particles from wastewater generated by power plants such as flue gas wastewater, oil and gas wastewater, and other industrial processes. For example, the methods and systems disclosed herein may be used to filter one or more precipitated salts from a wastewater feed concentrate formed during the forward osmosis process that is recirculated
(Continued)

through at least one membrane module to continue the forward osmosis process. Filtering the one or more precipitated salts from the wastewater feed concentrate helps limit clogging of open channel feed spacer(s) of the at least one membrane module.

53 Claims, 7 Drawing Sheets

(51) Int. Cl.
*C02F 1/00* (2006.01)
*B01D 61/00* (2006.01)
*B01D 63/10* (2006.01)
*C02F 1/42* (2006.01)
*C02F 1/52* (2006.01)
*C02F 1/24* (2006.01)
*C02F 1/463* (2006.01)
*C02F 1/66* (2006.01)
*C02F 5/06* (2006.01)
*C02F 101/10* (2006.01)
*C02F 103/36* (2006.01)

(52) U.S. Cl.
CPC .......... *C02F 1/445* (2013.01); *B01D 2311/08* (2013.01); *B01D 2311/25* (2013.01); *B01D 2311/2649* (2013.01); *B01D 2313/143* (2013.01); *B01D 2313/146* (2013.01); *C02F 1/004* (2013.01); *C02F 1/24* (2013.01); *C02F 1/42* (2013.01); *C02F 1/444* (2013.01); *C02F 1/463* (2013.01); *C02F 1/52* (2013.01); *C02F 1/66* (2013.01); *C02F 5/06* (2013.01); *C02F 2101/101* (2013.01); *C02F 2103/36* (2013.01); *C02F 2301/046* (2013.01)

(58) Field of Classification Search
CPC ...... C02F 2301/046; C02F 1/24; C02F 1/444; C02F 1/463; C02F 1/66; C02F 5/06; C02F 1/42; C02F 1/52; B01D 61/002; B01D 63/10; B01D 2311/08; B01D 2311/25; B01D 2311/2649; B01D 2313/143; B01D 2313/146; B01D 63/103; B01D 63/106; B01D 63/12
See application file for complete search history.

(56) References Cited

U.S. PATENT DOCUMENTS

| | | | |
|---|---|---|---|
| 6,168,648 B1 * | 1/2001 | Ootani | B01D 19/0031 |
| | | | 210/321.76 |
| 6,673,242 B1 | 1/2004 | Herron | |
| 2012/0205309 A1 | 8/2012 | Sano et al. | |
| 2014/0151300 A1 | 6/2014 | Savage et al. | |
| 2014/0183134 A1 | 7/2014 | Herron | |
| 2014/0246372 A1 | 9/2014 | Musale et al. | |
| 2015/0157984 A1 | 6/2015 | Uda et al. | |
| 2017/0028349 A1 * | 2/2017 | Blandin | B01D 61/005 |

OTHER PUBLICATIONS

U.S. Appl. No. 62/252,280, filed Nov. 6, 2015.

* cited by examiner

METHODS AND SYSTEMS FOR TREATING WASTEWATER VIA FORWARD OSMOSIS

CROSS-REFERENCE TO RELATED APPLICATIONS

This application claims priority to U.S. Provisional Application 62/252,280 filed on 6 Nov. 2015, the disclosure of which is incorporated herein, in its entirety, by this reference.

BACKGROUND

Regulations for discharge of power generation, industrial, or oil and gas wastewater to waterways are becoming more restrictive. Often, the major contaminants in the wastewater are inorganic salts that require expensive and energy-intensive removal methods.

Evaporation is one typical, conventional method for separation of salt from water. Evaporation technique can be very energy intensive, requires metal construction that is subject to corrosion and, with many wastewaters, requires extensive pretreatment to control scaling. Mechanical vapor recompression ("MVR") evaporators can reduce energy costs, but, due to the exotic materials needed to control corrosion, MVR has high capital costs.

Reverse osmosis is a membrane technology that removes water from salt solutions for lower cost than evaporators. However, standard high pressure reverse osmosis is unable to remove water from solutions with salt contents above about 70,000 TDS. Reverse osmosis also often requires pretreatment to remove turbidity and scaling species from the feed water.

There are other membrane systems that can concentrate wastewaters to concentrations above 70,000 TDS. Disc-tube filters are designed to operate at pressures that can achieve over 100,000 TDS in non-scaling fluids. Also, an ammonium-bicarbonate-based forward osmosis membrane system can concentrate sodium chloride solutions to above 250,000 TDS is also available. For all of the membrane systems, evaporative crystallization of the residual solution is required if "zero liquid discharge" ("ZLD") is desired.

Pretreatment of wastewater before salt removal can be expensive and involved. Pretreatment for membrane systems often includes coarse filtration followed by dissolved air floatation, flocculation or electrocoagulation to remove turbidity, then followed by lime softening or ion exchange to remove sealants, then followed by acidification, then followed by ultrafiltration to remove residual turbidity.

Accordingly, manufacturers and users of wastewater treatment systems continue to seek improved systems and methods for treating wastewater.

SUMMARY

Embodiments disclosed herein are directed to methods and systems for treating wastewater via forward osmosis. By way of example, the methods and systems disclosed herein may be used to filter one or more precipitated salts and/or other particles from wastewater generated by power plants, oil and gas wastewater, and other industrial processes. For example, the methods and systems disclosed herein may be used to filter one or more precipitated salts from a wastewater feed concentrate formed during the forward osmosis process that is recirculated through at least one membrane module to continue the forward osmosis process. Filtering the one or more precipitated salts from the wastewater feed concentrate helps limit clogging of open channel feed spacer(s) of the at least one membrane module.

In an embodiment, a method of treating wastewater is disclosed. At least one membrane module is provided, which includes a draw tube and a membrane sheet spirally wound about the draw tube. The membrane sheet includes one or more leaves each of which includes an open channel feed spacer and a permeate structure. The permeate structure includes at least one membrane and at least one porous permeate spacer. A wastewater feed solution is flowed from a wastewater source into the open channel feed spacer of the at least one membrane module. The wastewater feed solution includes one or more salts. A draw solution is flowed into a draw tube and through the permeate structure of the at least one membrane module. Via forward osmosis, the one or more salts of the wastewater feed solution are concentrated, which flows out of the open channel feed spacer as wastewater feed concentrate including precipitates of the one or more salts. Via forward osmosis, the draw solution is diluted, which flows out of the draw tube of the at least one membrane module. At least a portion of the wastewater feed concentrate is filtered of at least some of the precipitates, which flows out of the at least one membrane module. The filtered wastewater feed concentrate is recirculated, as a recirculated wastewater feed solution, into the open channel feed spacer of the at least one membrane module concurrently with the draw solution flowing through the at least one membrane module to continue the forward osmosis process.

In an embodiment, a system for treating wastewater via forward osmosis is disclosed. The system includes a wastewater source configured to provide a wastewater feed solution, and a draw solution source configured to provide a draw solution. The system further includes at least one membrane module. The at least one membrane module includes a draw tube defining a draw solution flow passageway that is in fluid communication with the draw solution source to receive the draw solution therefrom. The draw tube includes a plurality of openings formed therein in fluid communication with the draw solution flow passageway. The at least one membrane module includes a membrane sheet spirally wound about the draw tube. The membrane sheet includes one or more leaves each of which includes an open channel feed spacer at least partially defining a wastewater feed channel that is in fluid communication with the wastewater feed solution, and a permeate structure defining a draw solution fluid flow channel to receive the draw solution from the draw tube. The permeate structure includes at least one membrane and at least one porous permeate spacer. The system also includes a particle filter in fluid communication with the at least one membrane module to receive the wastewater feed solution exiting therefrom as wastewater feed concentrate. The particle filter is configured to filter precipitates of one or more salts from the wastewater feed concentrate. The system additionally includes a recirculation pump in fluid communication with the particle filter and configured to recirculate the filtered wastewater feed solution through the at least one membrane module.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical elements or features in different views or embodiments shown in the drawings.

FIG. 1 is a schematic diagram of a wastewater treatment system for treating wastewater via forward osmosis, according to an embodiment.

DETAILED DESCRIPTION

Figure 1:
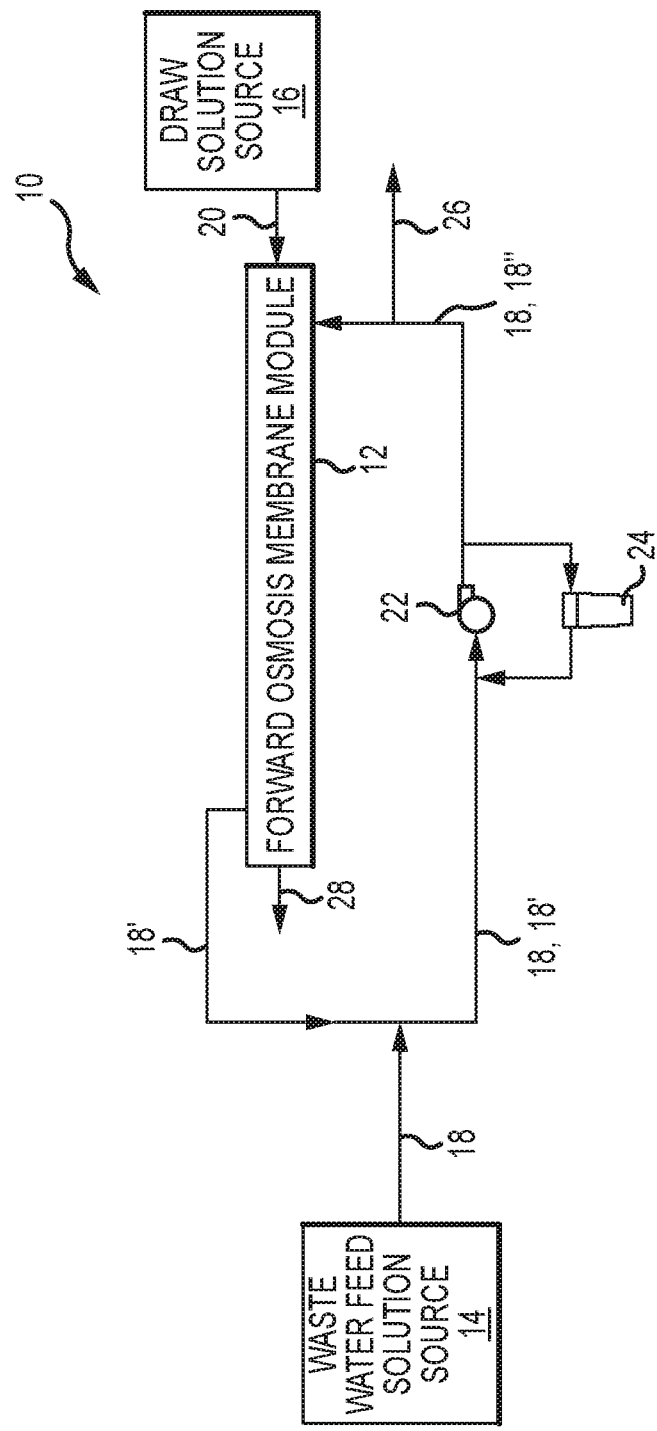

Embodiments disclosed herein are directed to methods and systems for treating wastewater via forward osmosis. By way of example, the methods and systems disclosed herein may be used to filter one or more precipitated salts (e.g., calcium sulfate, calcium silicate, calcium carbonate, other precipitating salts, or combinations thereof) and/or other particles from wastewater generated by power plants such as flue gas wastewater, oil and gas wastewater, and other industrial processes. For example, the methods and systems disclosed herein may be used to filter one or more precipitated salts from a wastewater feed concentrate formed during the forward osmosis process that is recirculated through at least one membrane module to continue the forward osmosis process. Filtering the one or more precipitated salts from the wastewater feed concentrate helps limit clogging of open channel feed spacer(s) of the at least one membrane module. The relatively low pressure used in forward osmosis compared to reverse osmosis also helps limit clogging of the open channel feed spacer(s) of the at least one membrane module.

In one or more embodiments, methods and systems for treating wastewater are disclosed. At least one membrane module is provided, which includes a draw tube and a membrane sheet spirally wound about the draw tube. The membrane sheet includes one or more leaves each of which includes an open channel feed spacer and a permeate structure. The permeate structure includes at least one membrane and at least one porous permeate spacer. A wastewater feed solution, including one or more salts dissolved therein, is flowed from a wastewater source through the open channel feed spacer of the at least one membrane module. The open channel feed spacer is sized and configured so that relatively large particles in the wastewater feed solution and precipitated salts do not clog or otherwise obstruct fluid flow through the open channel feed spacer. A draw solution is flowed into the draw tube and through the at least one porous permeate spacer of the permeate structure of the at least one membrane module. Via forward osmosis, the one or more salts of the wastewater feed solution are concentrated, which flows out of the open channel feed spacer as wastewater feed concentrate including precipitates of the one or more salts. The precipitates form due to precipitation of the one or more salts during concentration of the wastewater feed solution during the forward osmosis process. Via forward osmosis, the draw solution is diluted, which that flows out of the draw tube of the at least one membrane module. Stated another way, water from the wastewater solution fluid flow diffuses through the at least one membrane into the draw solution of the draw solution fluid flow flowing through an adjacent at least one porous permeate spacer of the adjacent permeate structure due to forward osmosis. At least a portion of the wastewater feed concentrate is filtered of at least some of the precipitates via a particle filter, which flows out of the at least one membrane module. The filtered wastewater feed concentrate is recirculated, as a recirculated wastewater feed solution, into the open channel feed spacer of the at least one membrane module concurrently with the draw solution flowing through the at least one membrane module to continue the forward osmosis process. During the formation of the precipitates, the precipitates may also entrain turbidity and, when the precipitates are filtered, suspended solids in the wastewater feed solution are also filtered.

FIG. 1 is a schematic diagram of a wastewater treatment system 10 for treating wastewater via forward osmosis, according to an embodiment. The wastewater treatment system 10 includes one or more forward osmosis membrane modules 12 in fluid communication with a wastewater source 14 that provides wastewater feed solution 18 and a draw solution source 16 that provides draw solution 20. For example, the membrane module 12 may be configured as any of the membrane modules disclosed in PCT International Application No. PCT/US2016/053321 filed on 23 Sep. 2016, which is incorporated herein, in its entirety, by this reference. However, it should be noted that other types of membrane modules may be used in the wastewater treatment system 10 other than those disclosed in PCT International Application No. PCT/US2016/053321.

The wastewater feed solution 18 from wastewater source 14 may be wastewater from a coal power plant such as flue gas wastewater, wastewater from an oil and gas processing system, or other wastewater desired to be treated. In some embodiments, the wastewater feed solution 18 may be flowed through the wastewater treatment system 10 without the wastewater feed solution 18 undergoing pretreatment, such as one or more of coarse filtration, dissolved air floatation, flocculation, electrocoagulation, lime softening, ion exchange, acidification, or ultrafiltration. However, in other embodiments, the wastewater feed solution 18 may undergo any of the foregoing pretreatments or combinations thereof, as needed or desired. The wastewater feed solution 18 includes one or more salts dissolved therein, including calcium sulfate, calcium silicate, calcium carbonate, other precipitating salts, or combinations thereof.

The draw solution source 16 is in fluid communication with and configured to the flow draw solution 20 into a draw tube of the membrane module 12, which flows out openings in the draw tube and through a permeate structure of the membrane module 12. For example, the draw solution 20 may include a 2 M aqueous sodium chloride solution or other suitable osmotic solution.

The wastewater treatment system 10 includes a recirculation pump 22 that is in fluid communication with the wastewater source 14 to receive the wastewater feed solution 18 therefrom and further in fluid communication with the membrane module 12 to receive wastewater feed concentrate 18' flowed out of the membrane module 12 during the forward osmosis process. The recirculation pump 22 is configured to pump at least a portion of the wastewater feed solution 18 and the wastewater feed concentrate 18' through a particle filter 24 and further through the membrane module 12. For example, the recirculation pump 22 may include a centrifugal pump or other suitable corrosion resistant pump. For example, the particle filter 24 may be any suitable particle filter, such as one or more of a disc filter, a cartridge filter, a filter-press, a belt filter, a cyclone, or a centrifuge. The particle filter 24 is configured to filter particles having an average particle size of about 150 μm or less, about 50 μm to about 150 μm, or about 75 μm to about 100 μm. As will be discussed in more detail below, the particle filter 24 is used to filter one or more precipitated salts from the wastewater feed concentrate 18' that flows out of the membrane module 12. The filtering performed by the particle filter 24 helps limit clogging of open channel feed spacer(s) of the membrane module 12. During the formation of the one or more precipitated salts, the one or more precipitated salts may also entrain turbidity and, when the one or more precipitated salts are filtered, suspended solids in the wastewater feed solution are also filtered.

In operation, the wastewater feed solution 18 is flowed or pumped from the wastewater source 14 to the recirculation pump 22 via one or more fluid lines or conduits. The recirculation pump 22 pumps at least a portion of the wastewater feed solution 18 through the particle filter 24 that can filter, if present, coarse particles from the wastewater feed solution 18 prior to the recirculation pump 22 pumping the wastewater feed solution 18 into the open channel feed spacer(s) of the membrane module 12. The draw solution 20 is flowed or pumped into the draw tube via one or more fluid lines or conduits, out openings of the draw tube, and through the permeate structure of the membrane module 12. Via forward osmosis across a membrane(s), the one or more salts of the wastewater feed solution 18 are concentrated, which flows out of the open channel feed spacer(s) of the membrane module 12 on the opposite side thereof as the wastewater feed concentrate 18' that includes precipitates of the one or more salts. Via forward osmosis, the draw solution 20 is diluted, which flows out of the draw tube of the membrane module 12 as diluted draw solution 28. At least a portion of the wastewater feed concentrate 18' flowing out of the membrane module 12 including the precipitates of the one or more salts therein, is pumped by the recirculation pump 22 through the particle filter 24 to filter at least some of the precipitates therefrom. The filtered wastewater feed concentrate 18" is pumped by the recirculation pump 22 and recirculated, as a recirculated wastewater feed solution, into the open channel feed spacer(s) of the membrane module concurrently with the draw solution 20 flowing into the membrane module 12 to continue the forward osmosis process. This process of filtering the wastewater feed concentrate 18' and recirculating the filtered wastewater feed concentrate 18" as wastewater feed solution may be repeated as many times as needed or desired, such as 50 to 100 times, or 75 to 100 times. When recirculation process is complete, wastewater feed concentrate 26 exits the wastewater treatment system 10 without further filtering of the precipitates of the one or more salts.

In some embodiments, only a portion of the flow of the wastewater feed solution 18 and the wastewater feed concentrate 18' is flowed through and filtered by the particle filter 24. In such an embodiment, the unfiltered flow of the wastewater feed solution 18 and the wastewater feed concentrate 18' is still pumped by the recirculation pump 22 through the open channel feed spacer(s) of the membrane module 12. However, the filtering may be effective to keep the total suspended solids (e.g., the precipitates and other particles) in the wastewater feed solution 18, the wastewater feed concentrate 18', and the filtered wastewater feed concentrate 18" to about 10,000 ppm or less, such as about 1,000 ppm to about 10,000 ppm, about 2,000 ppm to about 5,000 ppm, about 1,500 ppm to about 4,000 ppm, or about 2,000 ppm or less in order to prevent clogging of the open channel feed spacer(s) of the membrane module 12. However, in other embodiments, all of the flow of the wastewater feed solution 18 and the wastewater feed concentrate 18' is flowed through and filtered by the particle filter 24.

In some embodiments, a plurality of the membrane modules 12 may be operably fluidly coupled in series and/or in parallel. In order to reconcentrate the diluted draw solution 28, the diluted draw solution 28 may further be subject to a reverse osmosis process using one or more reverse osmosis membrane modules (not shown) to remove the salts present in the diluted draw solution 28 (e.g., sodium chloride) as disclosed in PCT International Application No. PCT/US2016/053321, which was previously incorporated by reference.

Figure 2:
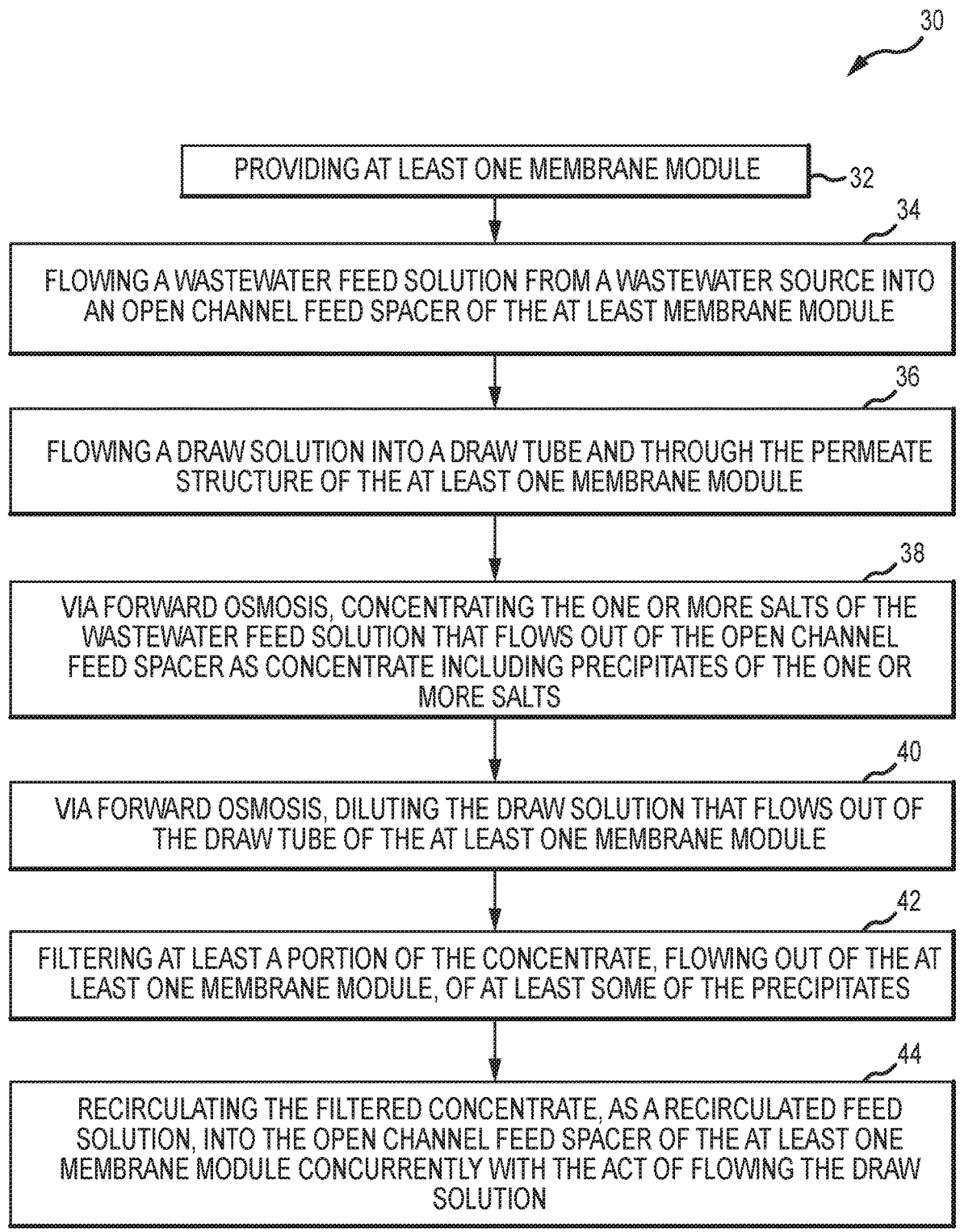
FIG. 2 is a flow chart of a method of treating wastewater, according to an embodiment.

FIG. 2 is a flow chart of a method 30 of treating wastewater, according to an embodiment. The method 30 includes an act 32 of providing at least one membrane module. The membrane module may be configured as any of the membrane modules disclosed herein. For example, the membrane module includes a draw tube, and a membrane sheet spirally wound about the draw tube. The membrane sheet includes one or more leaves, each of which includes an open channel feed spacer, and a permeate structure including at least one membrane and at least one porous permeate spacer.

The method includes an act 34 of flowing a wastewater feed solution from a wastewater source into the open channel feed spacer of the at least one membrane module, wherein the wastewater feed solution includes one or more salts dissolved therein. The method includes an act 36 of flowing a draw solution into draw tube and through the at least one porous permeate spacer of the permeate structure of the at least one membrane module.

The method includes an act 38 of via forward osmosis, concentrating the one or more salts of the wastewater feed solution that flows out of the open channel feed spacer as concentrate including precipitates of the one or more salts. The method includes an act 40 of via forward osmosis, diluting the draw solution that flows out of the draw tube of the at least one membrane module.

The method includes an act 42 filtering at least a portion of the concentrate via a particle filter, flowing out of the at least one membrane module, of at least some of the precipitates. For example, only a portion of or substantially all of the flow of the concentrate flowing out of the at least one membrane module may be filtered.

The method includes an act 44 of recirculating the filtered concentrate, as a recirculated feed solution, into the open channel feed spacer of the at least one membrane module concurrently with the act of flowing the draw solution through the at least one membrane module to continue the forward osmosis process.

In an embodiment, in act 34, the wastewater feed solution may be flowed directly from the wastewater source through the system. In some embodiments, the wastewater feed solution may be flowed from the wastewater source through the system without the wastewater undergoing a pretreatment process, such as one or more of coarse filtration, dissolved air floatation, flocculation, electrocoagulation, lime softening, ion exchange, acidification, or ultrafiltration. However, in other embodiments, the wastewater feed solution 18 may undergo any of the foregoing pretreatments or combinations thereof, as needed or desired.

In an embodiment, in acts 34 and 44, the wastewater feed solution and the filtered concentrate may be flowed through the membrane module with a cross-flow velocity of about 0.2 m/s to about 1 m/s, such as about 0.5 m/s to about 1 m/s.

In some embodiments, in act 42, the particle filter may filter the precipitates of the one or more salts having an average particle size of about 150 µm or less, about 50 µm to about 150 µm, or about 75 µm to about 100 µm. For example, the filtering of the precipitates of the one or more salts may be accomplished with one or more of a disc filter, a cartridge filter, a filter-press, a belt filter, a cyclone, or a centrifuge. Filtering the precipitates of the one or more salts helps limit clogging of the open channel feed spacer of the at least one membrane module. During the formation of the precipitates, the precipitates may also entrain turbidity and, when the precipitates are filtered, suspended solids in the wastewater feed solution are also filtered.

The act 42 of filtering may be effective to filter total suspended solids (e.g., the precipitates and other particles) in the wastewater feed solution and the concentrate so that the filtered wastewater feed solution and the recirculated feed solution exhibit a total suspended solids therein of about 10,000 ppm or less, such as about 1,000 ppm to about 10,000 ppm, about 2,000 ppm to about 5,000 ppm, about 1,500 ppm to about 4,000 ppm, or about 2,000 ppm or less. By maintaining the total suspended solids in the filtered wastewater feed solution and the recirculated feed solution to a level of about 10,000 ppm or less, clogging of the open channel feed spacer(s) in the at least one membrane module may be reduced or prevented.

In some embodiments, in act 44, recirculating the filtered concentrate, includes pumping the recirculated feed solution into the open channel feed spacer of the at least one membrane module via a recirculation pump.

Figure 3A:
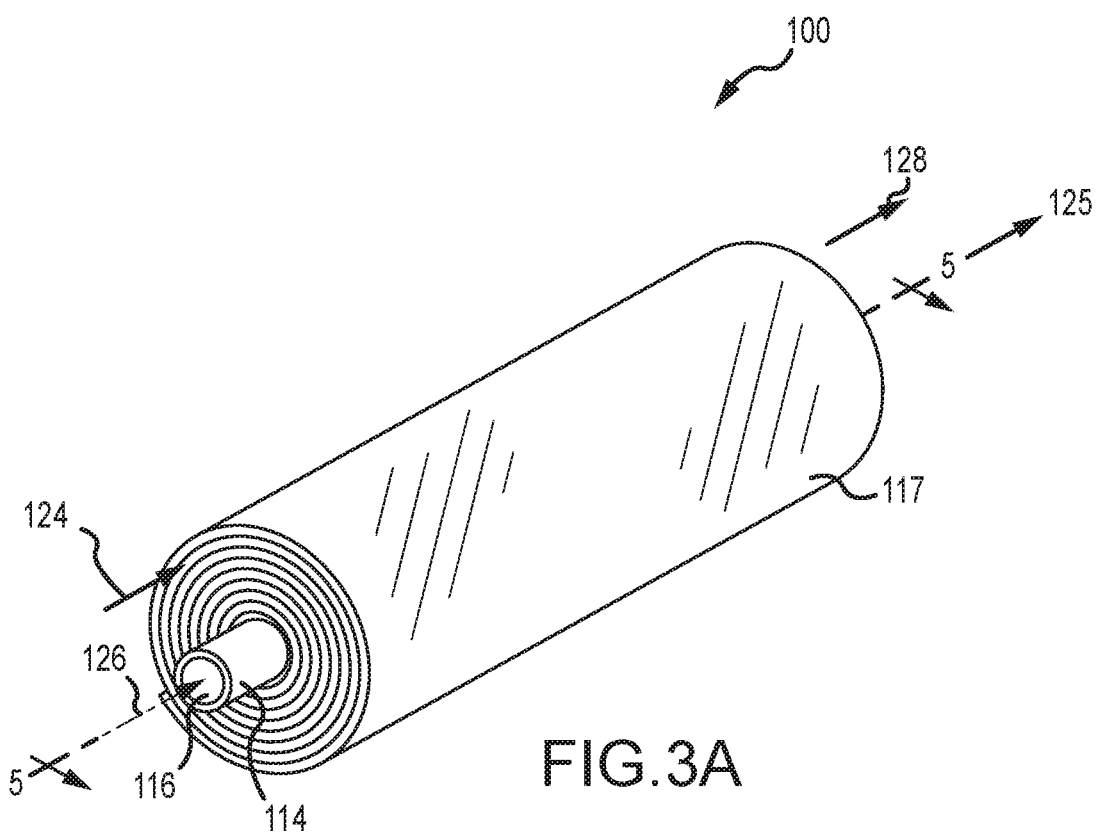
FIG. 3A is a schematic isometric view of a multi-leaf membrane module, according to an embodiment, which may be used in any of the systems and methods for treating wastewater disclosed herein.
Figure 4A:
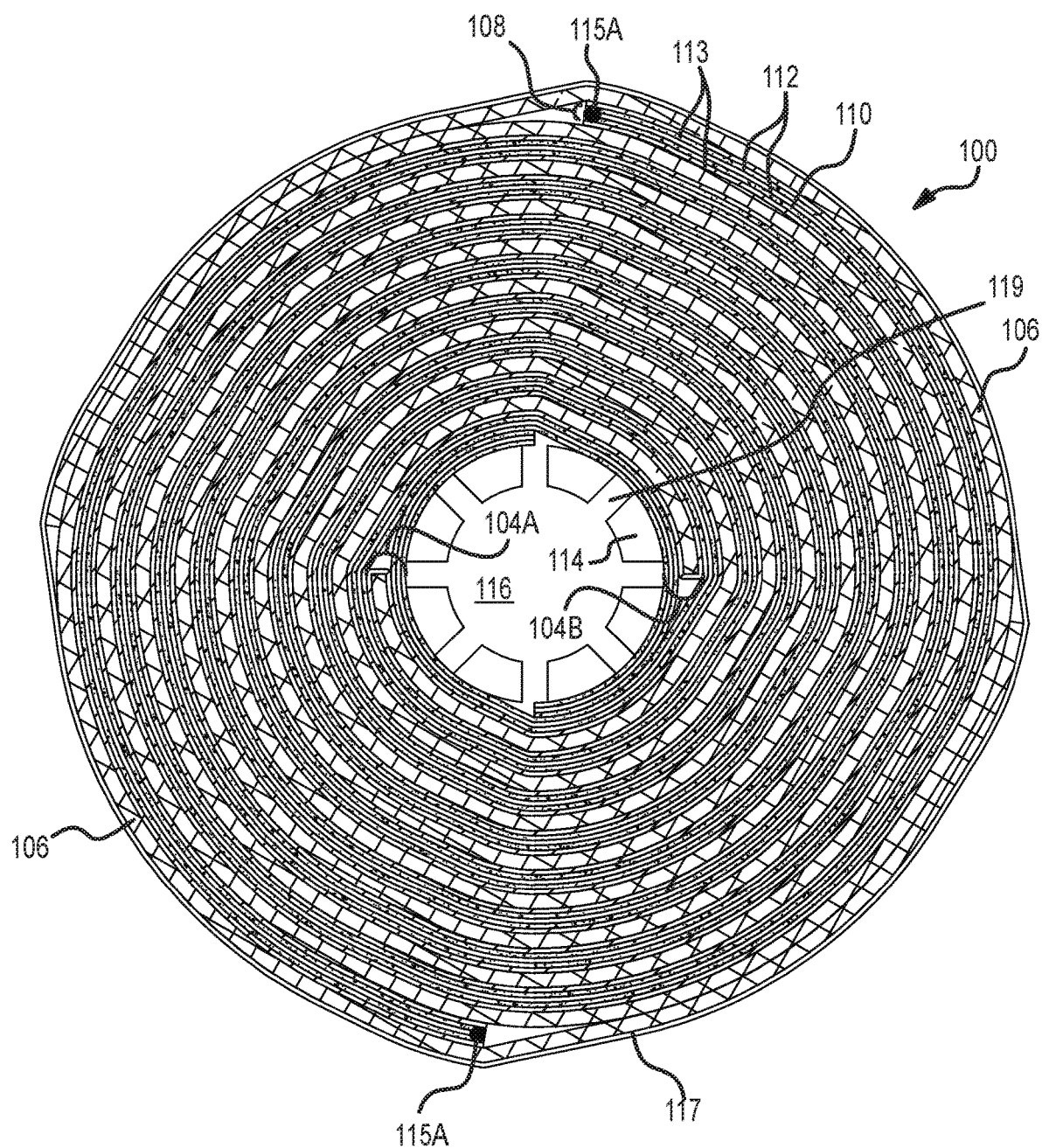
FIG. 4A is an enlarged front end view of the membrane module of FIG. 3A.
Figure 4B:
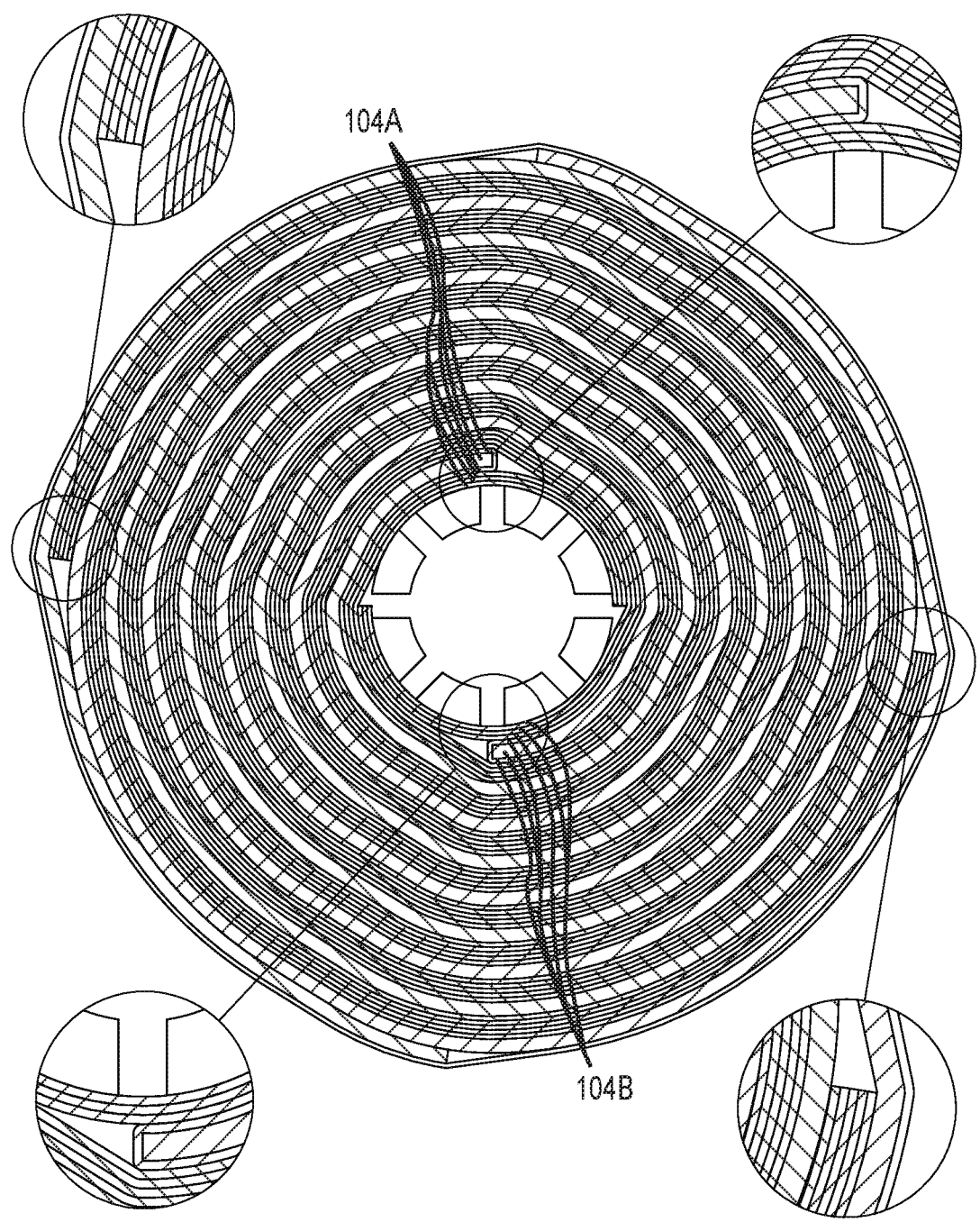
FIG. 4B is an enlarged front end view of the membrane module of FIG. 3A, with different leaves thereof shown with different cross-hatching.

FIG. 3A is a schematic isometric view and FIGS. 4A-4B are enlarged front end view of a spiral wound, multi-leaf membrane module 100, according to an embodiment, which may be used as the membrane module 12 in any of the system and methods for treating wastewater disclosed herein. Referring to FIGS. 3A and 4A, the membrane module 100 includes a membrane sheet having two or more leaves 104A and 104B that are also referred to herein as leaves 104. With reference to FIG. 4B, the leaves 104A and 104B alternate with each other along a radial direction of the membrane module 100. In FIG. 4B, the leaf 104A is shown with cross-hatching to the left and the leaf 104B is shown with cross-hatching to the right. The membrane sheet, including the leaves 104 thereof, is spiral wound about and supported by a draw tube 114.

Referring specifically to FIG. 4A, each of the leaves 104 includes an open channel feed spacer 106 layered with a permeate structure 108. In some embodiments, the permeate structure 108 includes a stiffener layer 110 sandwiched between two porous permeate spacers 112, and at least one membrane 113 adjacent to a radially outermost one of the two porous permeate spacers 112. It should be understood that the terms "permeate structure" and "permeate spacers" are terms from the reverse osmosis technology area, but are still used to describe forward osmosis membrane modules even though a permeate does not flow through the permeate structure. The stiffening layer 110 provides sufficient rigidity to the permeate structure 108 to facilitate spiral winding of the membrane sheet about the draw tube 114, while maintaining the desired arrangement of the components of the membrane module 100.

For the leaf 104A, a radially outermost one of the membranes 113 is associated with the leaf 104A, while a radially innermost one of the membranes 113 adjacent to the permeate structure 108 of the leaf 104A is associated with the other leaf 104B. Stated another way, each of the leaves 104 includes one of the membranes 113 positioned radially inwardly from a corresponding feed spacer 106 thereof.

The membranes 113 are bonded to the porous permeate spacers 112 along three sides thereof using an adhesive 115A, such as a suitable glue (e.g., a polyurethane-based glue or other suitable glue). The side of the membranes 113 of the permeate structures 108 proximate to draw tube 114 is not bonded to the underlying porous permeate spacers 112 thereof via the adhesive 115A so there is a free fluid path through the porous permeate spacers 112 from the draw tube 114 that is not obstructed by the adhesive 115A. The thickness of the membranes 113 in FIG. 4A is illustrated thicker relative to the thickness of the permeate structure 108 than if the membranes 113 were drawn to scale.

As shown in FIG. 4A, a terminal end of each feed spacer 106 of one of the leaves 104 proximate to the draw tube 114 is enclosed by the membrane 113 associated with the leaf 104. For example, the terminal end of the feed spacer 106 can have the membrane 113 associated therewith wrapped around it. By enclosing the terminal end of each of the feed spacers 106, draw solution fluid flow 126 and wastewater feed solution fluid flow 124 may be prevented from mixing together and/or the wastewater feed solution fluid flow 124 may be prevented from being pumped directly into the draw tube 114.

Figure 3B:
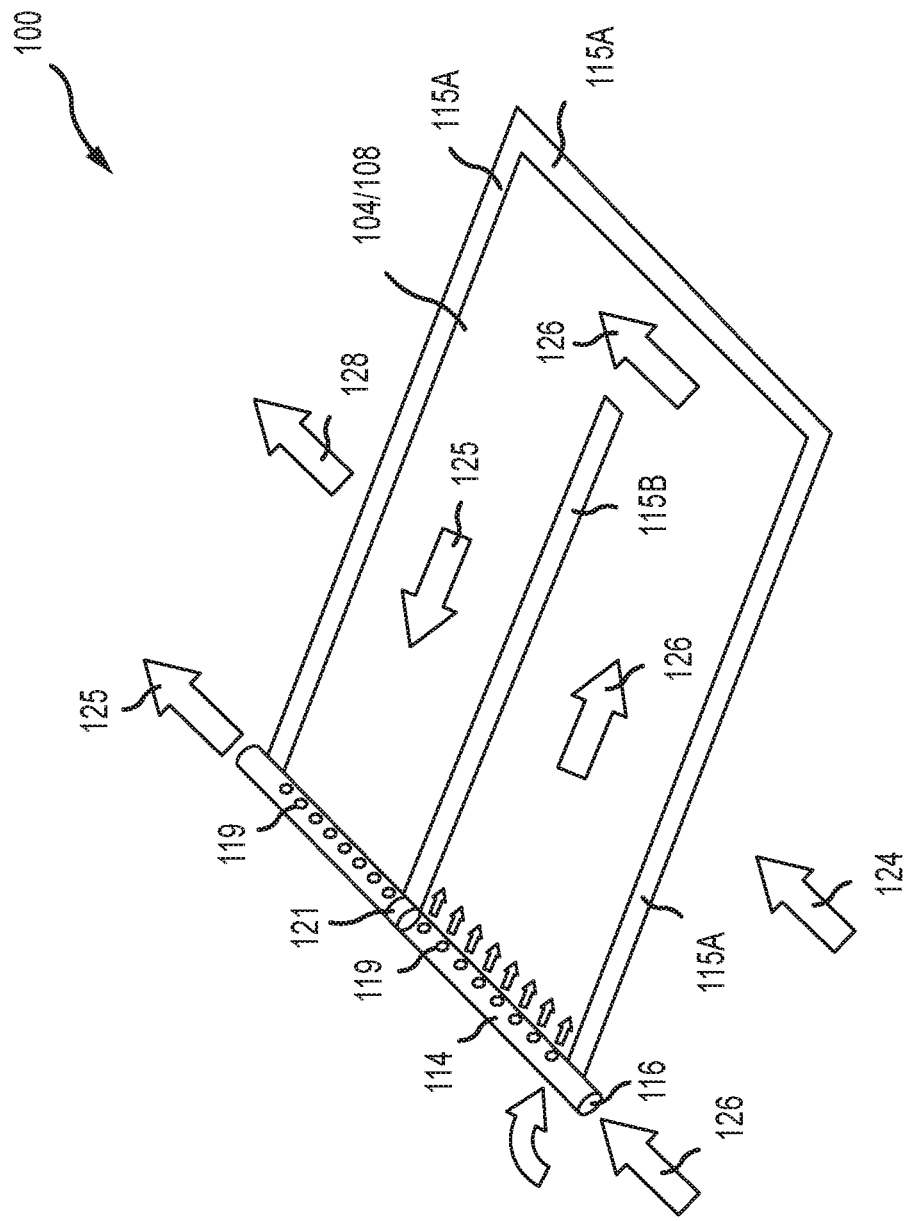
FIG. 3B is an isometric view of the membrane module of FIG. 3A, with the membrane sheet unwound to illustrate a flow path that a draw solution flows during use.

Referring to FIG. 3B, a plug or barrier 121 may be disposed in a draw solution flow passageway 116 defined by the draw tube 114 that blocks draw solution fluid flow 126 through the draw tube 114 so the draw solution fluid flow 126 cannot flow completely through the draw solution flow passageway 116. Additional adhesive 115B is provided that bonds the membranes 113 to the porous permeate spacers 112. The adhesive 115B is positioned and configured to divide the porous permeate spacer 112 of the permeate structure 108 to provide a flow path for the draw solution 126 that flows into the draw tube 114, out of the openings 119 of the draw tube 114, around the adhesive 115B, through the openings 119 on the other side of the barrier 121, and out of the draw tube 114 as diluted draw solution 125.

Referring again to FIG. 4A, a protective shell 117 may enclose a circumference of the spiral wound membrane sheet to hold the spiral wound membrane sheet in place, seal the circumference of the membrane module 102, and protect the components of the membrane module 100 such as the feed spacers 106 and the permeate structures 108. For example, the protective shell 117 may be formed from fiberglass, plastic shrink-wrapped onto the circumference of the spiral wound membrane sheet, another suitable composite material, or another suitable material.

It should be noted that although only two leaves 104 are shown in the illustrated embodiment for ease of illustration, the number of leaves in the membrane modules disclosed herein may vary from one embodiment to the next. For example, in other embodiments, the membrane sheet may include a single leaf 104, at least three leaves 104, at least four leaves 104, at least five leaves 104, at least six leaves 104, at least seven leaves 104, at least eight leaves 104, at least nine leaves 104, at least ten leaves 104, at least eleven leaves 104, fifteen or more leaves 104, or even twenty or more leaves 104. When two or more leaves 104 are used, the membrane sheet of the membrane module 102 disclosed herein may be relatively shorter than if only one leaf 104 was used, yet still enabling at least the same or greater separation efficiency for the membrane module 102. When two or more leaves 104 are used, the membrane module 100 may be formed from a relatively shorter membrane sheet than if only one leaf 104 was used. For example, the membrane sheet may have a length of about 20 inches to about 40 inches, such as about 30 inches.

Figure 5:
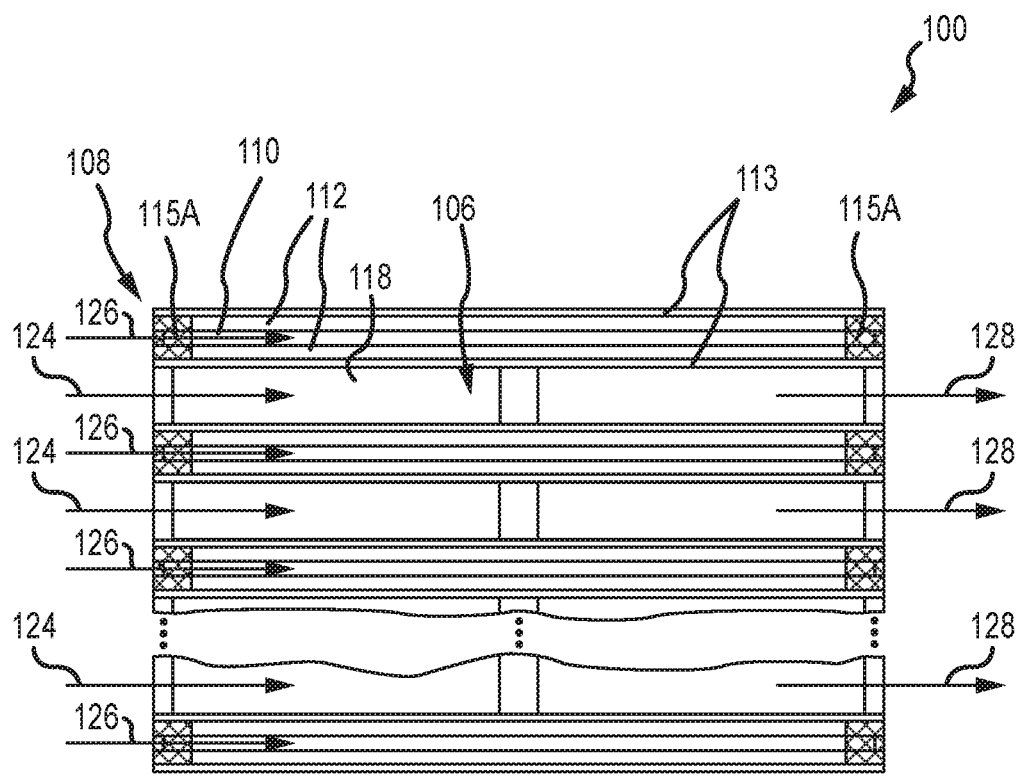
FIG. 5 is a partial, cross-sectional view of the membrane module of FIG. 3A taken along line 5-5 thereof.

Referring to FIG. 5, which is a partial, cross-sectional view of the membrane module 100 of FIG. 3A taken along line 4-4 thereof, each of the feed spacers 106 includes two or more openings 118 formed therein that partially defines a feed channel for wastewater solution fluid flow 124 (e.g., the wastewater feed solution 18 and the filtered wastewater feed concentrate 18" shown in FIG. 1) to flow therethrough. As previously discussed, the wastewater solution fluid flow 124 may be filtered of particles prior to being flowed through the feed spacers 106 to help reduce or prevent clogging thereof. When present, the openings 118 help promote flow of the wastewater solution fluid flow 124 through the feed spacer 106 with limited or no clogging by precipitated salts or particulates in the wastewater solution fluid flow 124.

The corrugated openings and each opening 118 of a respective feed spacer 106 are in fluid communication with an adjacent permeate structure 108 to enable a portion of the water from the wastewater solution fluid flow 124 to diffuse through the membrane 113 of an adjacent permeate structure 108 via forward osmosis and allow the water to mix with and dilute the draw solution fluid flow 126 and travel to and through the openings 119 in the draw tube 114 to ultimately exit from the draw tube 114 as the diluted draw solution 125. Stated another way, the water from the wastewater solution fluid flow 124 diffuses through the membrane 113 into the draw solution of the draw solution fluid flow 126 flowing through the adjacent porous permeate spacers 112 of the adjacent permeate structure 108 due to forward osmosis. It should be noted that although the feed spacer 106 of the illustrated embodiment shown in FIG. 5 includes two openings, in other embodiments, the feed spacers disclosed herein may include only one opening, three or more openings, or no openings.

The feed spacers 106 may be formed from a corrugated spacer material. As described in more detail in PCT International Application No. PCT/US2016/053321, which was previously incorporated by reference, the openings 118 of the feed spacers 106 may be formed by selectively removing removable sections. The thickness and materials of the feed spacer 106 of the leaves 104 may vary from one embodiment to the next. For example, the feed spacers 106 may be formed from polyethylene, polypropylene, polystyrene, polyester, any other appropriate material, or combinations thereof, and may be in the form of a corrugated structure. The thickness of the feed spacer 106 may be, for example, about 0.020 inch to about 0.20 inch, such as about 0.045 inch to about 0.10 inch. Such a thickness for the feed spacer 106 helps prevent relatively large particles and precipitated salts in the wastewater feed solution 124 from clogging the feed spacer 106. The size of the openings of the feed spacers 106 may be about 0.02 inch to about 0.2 inch (e.g., about 0.05 inch to about 0.1 inch, or about 0.08 inch to about 0.15 inch), which also helps prevent relatively large particles in the wastewater feed solution 124 and precipitated salts therein from clogging the feed spacer 106.

The thickness and materials of the permeate structure 108 of the leaves 104 may vary from one embodiment to the next. For example, the stiffening layer 110 of the permeate structure 108 may be formed from a plastic sheet material. The plastic sheet material for the stiffening layer 110 may be formed of polyvinyl chloride ("PVC"), chlorinated polyvinyl chloride ("C-PVC") polypropylene, polyethylene, polystyrene, acrylic, stainless steel, copper, copper alloys, tin, tin alloys, aluminum, aluminum alloys, or combinations thereof. For example, the stiffener layer 110 may be polyethylene for food uses, PVC for non-food uses, or C-PVC for high temperature uses. The thickness of the stiffening layer 110 may be, for example, about 0.010 inch to about 0.080 inch, such as about 0.020 inch to about 0.050 inch.

The porous permeate spacers 112 of the permeate structures 108 through which draw solution flow 126 flows may be formed from a mesh or net made from a polymeric material, such as polyester, epoxy-coated polyester, or other plastics. The thickness of the porous permeate spacers 112 may be, for example, about 0.0050 inch to about 0.10 inch, such as about 0.010 inch to about 0.030 inch.

The thickness and materials of the membranes 113 of the permeate structures 108 of the leaves 104 may vary from one embodiment to the next. For example, the membrane 113 may be formed from a multi-layer structure including a cellulose layer supported by a dense cellulose foam embedded with a woven polyester having a net of thickness of about 0.001 inch to about 0.005 inch. The thickness of the membrane 113 may be, for example, about 0.0030 inch to about 0.010 inch, such as about 0.0045 inch to about 0.0060 inch or about 0.0050 inch to about 0.0060 inch. A surface of the membrane 113 adjacent to the feed channel 106 over which the wastewater feed solution 124 flows may be hydrophilic and exhibits a surface roughness of less than 10 nm, such as about 5 nm $R_a$ to about 8 nm $R_a$, or about 3 nm $R_a$ to about 6 nm $R_a$. By providing a relatively low surface roughness surface for the membrane 113 that contacts the wastewater feed solution 124, caking and/or agglomeration of the one or more salts in the wastewater feed solution 124 on the membrane 113 can be reduced or eliminated, which prevents blocking of the membrane 113 that can render it inoperative.

In a specific embodiment, the feed spacers 106 may be formed from polystyrene having a thickness of about 0.085 inch, the stiffening layer 110 may be formed from polystyrene having a thickness of about 0.030 inch, the porous permeate spacers 112 may be formed from epoxy-coated polyester having a thickness of about 0.020 inches, and the membranes 113 may be formed from cellulose triacetate ("CTA") having a thickness of about 0.0060 inch.

Referring again to FIGS. 3A and 3B, in operation, draw solution of the draw solution fluid flow 126 is pumped by a pump or otherwise flowed to flow into the draw tube 114 of the membrane module 100. The draw solution fluid flow 126 flows through the draw tube 114, out of the openings 119 in the draw tube 114 on one side of the barrier 121, and through the porous permeate spacers 112 of the permeate structure(s) 108, and back out of the draw tube 114 via the openings 119 as the diluted draw solution 125 on the other side of the barrier 121. The wastewater feed solution fluid flow 124 flows through the feed spacers 106 and exits the membrane module 100 as concentrate fluid flow 128. The concentrate fluid flow 128 that exits the membrane module 100 includes precipitates of the one or more salts. As previously discussed, via forward osmosis, the one or more salts of the wastewater feed solution 124 are concentrated, which flows out of the feed spacer(s) 106. Via forward osmosis, the draw solution of the draw solution fluid flow 126 is diluted, which that flows out of the draw tube 114 of the membrane module 100 as the diluted draw solution 125.

While various aspects and embodiments have been disclosed herein, other aspects and embodiments are contemplated. The various aspects and embodiments disclosed herein are for purposes of illustration and are not intended to be limiting.

What is claimed is:

1. A method of treating wastewater, the method comprising:
   providing at least one membrane module including:
      a draw tube; and
      a membrane sheet spirally wound about the draw tube, the membrane sheet including one or more leaves each of which includes:
         an open channel feed spacer; and
         a permeate structure including at least one membrane and at least one porous permeate spacer;
   flowing a wastewater feed solution from a wastewater source into the open channel feed spacer of the at least one membrane module, wherein the wastewater feed solution includes one or more salts;
   flowing a draw solution into a draw tube and through the permeate structure of the at least one membrane module;
   via forward osmosis, concentrating the one or more salts of the wastewater feed solution that flows out of the open channel feed spacer as wastewater feed concentrate including precipitates of the one or more salts;
   via forward osmosis, diluting the draw solution that flows out of the draw tube of the at least one membrane module;
   filtering at least a portion of the wastewater feed concentrate, flowing out of the at least one membrane module, of at least some of the precipitates; and
   recirculating the filtered wastewater feed concentrate, as a recirculated feed solution, into the open channel feed spacer of the at least one membrane module concurrently with the act of flowing the draw solution.

2. The method of claim 1 wherein the flowing the wastewater feed solution from the wastewater source into the open channel feed spacer of the at least one membrane module includes flowing the wastewater feed solution from the wastewater source to the at least one membrane module without the wastewater feed solution undergoing a pretreatment process.

3. The method of claim 2 wherein the pretreatment process includes one or more of coarse filtration, dissolved air floatation, flocculation, electrocoagulation, lime softening, ion exchange, acidification, or ultrafiltration.

4. The method of claim 1 wherein the wastewater source includes a power plant wastewater source or an oil and gas wastewater source.

5. The method of claim 1, further comprising pretreating the wastewater feed solution prior to flowing the wastewater feed solution into the open channel feed spacer of the at least one membrane module.

6. The method of claim 1 wherein the flowing the wastewater feed solution into the open channel feed spacer of the at least one membrane module includes flowing the wastewater feed solution through the membrane module with a cross-flow velocity of about 0.2 m/s to about 1 m/s.

7. The method of claim 6 wherein the cross-flow velocity is about 0.5 m/s to about 1 m/s.

8. The method of claim 1 wherein the filtering at least the portion of the wastewater feed concentrate, flowing out of the at least one membrane module, of at least some of the precipitates includes filtering substantially all of the wastewater feed concentrate prior to the act of recirculating the filtered wastewater feed concentrate.

9. The method of claim 1 wherein the filtering at least the portion of the wastewater feed concentrate, flowing out of the at least one membrane module, of at least some of the precipitates includes filtering only a portion of the wastewater feed concentrate prior to the act of recirculating the filtered wastewater feed concentrate.

10. The method of claim 1 wherein the filtering at least a portion of the wastewater feed concentrate, flowing out of the at least one membrane module, of at least some of the precipitates includes filtering the at least some of the precipitates from the wastewater feed concentrate having an average particle size of about 150 µm or less.

11. The method of claim 10 wherein the average particle size is about 75 µm to about 100 µm.

12. The method of claim 1 wherein the filtering at least the portion of the wastewater feed concentrate, flowing out of the at least one membrane module, of at least some of the precipitates includes filtering the precipitates from the wastewater feed concentrate with one or more of a disc filter, a cartridge filter, a filter-press, a belt filter, a cyclone, or a centrifuge.

13. The method of claim 1 wherein the filtering at least the portion of the wastewater feed concentrate, flowing out of the at least one membrane module, of at least some of the precipitates includes filtering the precipitates from the wastewater feed concentrate so that a total suspended solids therein is about 10,000 ppm or less.

14. The method of claim 13 wherein the total suspended solids is about 1,500 ppm to about 4,000 ppm.

15. The method of claim 1 wherein the recirculating the filtered wastewater feed concentrate, as a recirculated feed solution, into the open channel feed spacer of the at least one membrane module concurrently with the act of flowing the draw solution includes pumping the recirculated feed solution into the open channel feed spacer of the at least one membrane module.

16. The method of claim 1 wherein the one or more salts include at least one of calcium sulfate, calcium silicate, or calcium carbonate.

17. The method of claim 1 wherein the open channel feed spacer of each of the one or more leaves includes a corrugated spacer material.

18. The method of claim 1 wherein the open channel feed spacer includes at least one opening formed therein at least partially defining a feed channel.

19. The method of claim 1 wherein the open channel feed spacer of each of the one or more leaves exhibits a thickness of about 0.020 inch to about 0.20 inch.

20. The method of claim 19 wherein the thickness is about 0.045 inch to about 0.10 inch.

21. The method of claim 1 wherein the one or more leaves include two or more leaves.

22. The method of claim 1 wherein the at least one membrane of the permeate structure exhibits a surface roughness of less than 10 nm.

23. A method of treating wastewater, the method comprising:
   providing at least one membrane module including:
      a draw tube; and
      a membrane sheet spirally wound about the draw tube, the membrane sheet including one or more leaves each of which includes:
         an open channel feed spacer; and
         a permeate structure including at least one membrane and at least one porous permeate spacer;
   flowing a wastewater feed solution from a wastewater source into the open channel feed spacer of the at least one membrane module without the wastewater feed solution undergoing a pretreatment process, wherein the pretreatment process includes one or more of coarse filtration, dissolved air floatation, flocculation, electrocoagulation, lime softening, ion exchange, acidification, or ultrafiltration, wherein the wastewater feed solution includes one or more salts including calcium sulfate, calcium silicate, or calcium carbonate;

flowing a draw solution into a draw tube and through the permeate structure of the at least one membrane module;

via forward osmosis, concentrating the one or more salts of the wastewater feed solution that flows out of the open channel feed spacer as wastewater feed concentrate including precipitates of the one or more salts;

via forward osmosis, diluting the draw solution that flows out of the draw tube of the at least one membrane module;

filtering at least a portion of the wastewater feed concentrate, flowing out of the at least one membrane module, of at least some of the precipitates; and recirculating the filtered wastewater feed concentrate, as a recirculated feed solution, into the open channel feed spacer of the at least one membrane module concurrently with the act of flowing the draw solution.

24. The method of claim 23 wherein the wastewater source includes a power plant wastewater source.

25. The method of claim 23 wherein the wastewater source is an oil and gas wastewater source.

26. The method of claim 23 wherein the flowing the wastewater feed solution from the wastewater source into the open channel feed spacer of the at least one membrane module without the wastewater feed solution undergoing the pretreatment process includes flowing the wastewater feed solution through the at least one membrane module with a cross-flow velocity of about 0.2 m/s to about 1 m/s.

27. The method of claim 26 wherein the cross-flow velocity is about 0.5 m/s to about 1 m/s.

28. The method of claim 23 wherein the filtering at least the portion of the wastewater feed concentrate, flowing out of the at least one membrane module, of at least some of the precipitates includes filtering substantially all of the wastewater feed concentrate prior to the act of recirculating the filtered wastewater feed concentrate.

29. The method of claim 23 wherein the filtering at least the portion of the wastewater feed concentrate, flowing out of the at least one membrane module, of at least some of the precipitates includes filtering only a portion of the wastewater feed concentrate prior to the act of recirculating the filtered wastewater feed concentrate.

30. The method of claim 23 wherein the filtering at least the portion of the wastewater feed concentrate, flowing out of the at least one membrane module, of at least some of the precipitates includes filtering the at least some of the precipitates from the wastewater feed concentrate having an average particle size of about 150 µm or less.

31. The method of claim 23 wherein the filtering at least the portion of the wastewater feed concentrate, flowing out of the at least one membrane module, of at least some of the precipitates includes filtering the precipitates from the wastewater feed concentrate so that a total suspended solids therein is about 10,000 ppm or less.

32. The method of claim 31 wherein the total suspended solids is about 1,500 ppm to about 4,000 ppm.

33. The method of claim 23 wherein the open channel feed spacer of each of the one or more leaves exhibits a thickness of about 0.020 inch to about 0.20 inch.

34. The method of claim 33 wherein the thickness is about 0.045 inch to about 0.10 inch.

35. The method of claim 23 wherein the one or more leaves include two or more leaves.

36. The method of claim 23 wherein the at least one membrane of the permeate structure exhibits a surface roughness of less than 10 nm.

37. A system for treating wastewater via forward osmosis, the system comprising:
a wastewater source configured to provide a wastewater feed solution;
a draw solution source configured to provide a draw solution;
at least one membrane module including:
a draw tube defining a draw solution flow passageway that is in fluid communication with the draw solution source to receive the draw solution therefrom, the draw tube including a plurality of openings formed therein in fluid communication with the draw solution flow passageway;
a membrane sheet spirally wound about the draw tube, the membrane sheet including one or more leaves each of which includes:
an open channel feed spacer at least partially defining a feed channel that is in fluid communication with the wastewater feed solution; and
a permeate structure defining a draw solution fluid flow channel to receive the draw solution from the draw tube, the permeate structure including at least one membrane and at least one porous permeate spacer;
a particle filter in fluid communication with the at least one membrane module to receive the wastewater feed solution exiting therefrom as wastewater feed concentrate, the particle filter configured to filter precipitates of one or more salts from the wastewater feed concentrate; and
a recirculation pump in fluid communication with the particle filter and configured to recirculate the filtered wastewater feed solution through the at least one membrane module.

38. The system of claim 37 wherein the wastewater source is fluidly coupled to the membrane module such that the wastewater has not undergone a pretreatment process.

39. The system of claim 38 wherein the pretreatment process includes one or more of coarse filtration, dissolved air floatation, flocculation, electrocoagulation, lime softening, ion exchange, acidification, or ultrafiltration.

40. The system of claim 37 wherein the wastewater source includes a power plant wastewater source.

41. The system of claim 37 wherein the wastewater source includes an oil and gas wastewater source.

42. The system of claim 37 wherein the open channel feed spacer of each of the one or more leaves includes a corrugated spacer material.

43. The system of claim 37 wherein the open channel feed spacer includes at least one opening formed therein at least partially defining a feed channel.

44. The system of claim 37 wherein the open channel feed spacer of each of the one or more leaves exhibits a thickness of about 0.020 inch to about 0.20 inch.

45. The system of claim 44 wherein the thickness is about 0.045 inch to about 0.10 inch.

46. The system of claim 37 wherein the one or more leaves include two or more leaves.

47. The system of claim 37 wherein the at least one membrane of the permeate structure exhibits a surface roughness of less than 10 nm.

48. The system of claim 37 wherein the draw tube includes a draw solution flow passageway having a barrier disposed therein that blocks flow of the draw solution therethrough.

49. The system of claim 37 wherein the filter is configured to filter the precipitates having an average particle size of about 150 μm or less.

50. The method of claim 49 wherein the average particle size is about 75 μm to about 100 μm.

51. The system of claim 37 wherein the filter includes one or more of a disc filter, a cartridge filter, a filter-press, a belt filter, a cyclone, or a centrifuge.

52. The system of claim 37 wherein the recirculation pump is configured to pump only a portion of the wastewater feed solution received to through the particle filter.

53. The system of claim 37 wherein the recirculation pump is configured to pump substantially all of the wastewater feed solution received through the particle filter.

* * * * *